US005271254A

United States Patent [19]

Gloe et al.

[11] Patent Number: 5,271,254

[45] Date of Patent: Dec. 21, 1993

[54] CRIMPED CONNECTOR QUALITY CONTROL METHOD APPARATUS

[75] Inventors: Karl-Heinz Gloe, Reichelsheim; Harald Biehl, Bensheim, both of Fed. Rep. of Germany

[73] Assignee: The Whitaker Corporation, Wilmington, Del.

[21] Appl. No.: 59,430

[22] Filed: May 7, 1993

Related U.S. Application Data

[63] Continuation of Ser. No. 875,570, Apr. 27, 1992, abandoned, which is a continuation of Ser. No. 621,702, Dec. 3, 1990, abandoned.

[30] Foreign Application Priority Data

Dec. 5, 1989 [GB] United Kingdom ................ 8927467

[51] Int. Cl.$^5$ ...................... H01R 43/04; B23P 19/00

[52] U.S. Cl. .......................................... 72/19; 29/753; 29/705; 29/715

[58] Field of Search ............................ 72/3, 4, 19, 20; 100/99; 29/753, 705, 715, 863; 73/862.68, 862.53, 768, 818, 825, 855, 862.06, 862.54, 740

[56] References Cited

U.S. PATENT DOCUMENTS

| | | | |
|---|---|---|---|
| 4,010,679 | 3/1977 | Dybel | 100/99 |
| 4,342,233 | 8/1982 | Edmondson et al. | 73/862.06 |
| 4,400,873 | 8/1983 | Kindig et al. | 29/753 |
| 4,587,725 | 5/1986 | Ogawa et al. | 29/753 |
| 4,593,547 | 7/1986 | Heiberger | 72/19 |
| 4,696,708 | 9/1987 | Keller et al. | 156/64 |
| 4,856,186 | 8/1984 | Yeomans | 29/705 |
| 4,914,602 | 4/1990 | Abe et al. | 72/3 |
| 4,916,810 | 4/1990 | Yeomans | 29/863 |

FOREIGN PATENT DOCUMENTS

| | | | |
|---|---|---|---|
| 0184204 | 6/1986 | European Pat. Off. | 29/753 |

*Primary Examiner*—Lowell A. Larson
*Assistant Examiner*—Michael J. McKeon
*Attorney, Agent, or Firm*—Bruce J. Wolstoncroft; Eric J. Groen

[57] ABSTRACT

The quality of a crimped connection produced by the application of a crimping force (F) to a crimping barrel (WB) of an electrical terminal (T) with a wire (W) therein, is carried out by measuring the peak value (PV) of the crimping force (F) and comparing it with a reference value. The incremental values (IV) of the crimping force are measured during its application and are stored in the form of an actual crimping force value envelope (EA). The incremental values of an ideal crimping force are measured during its application and are stored in the form of an ideal crimping force value envelope (EI). The envelopes (EA and EI) are then compared to determine the quality of the crimped connection.

12 Claims, 10 Drawing Sheets

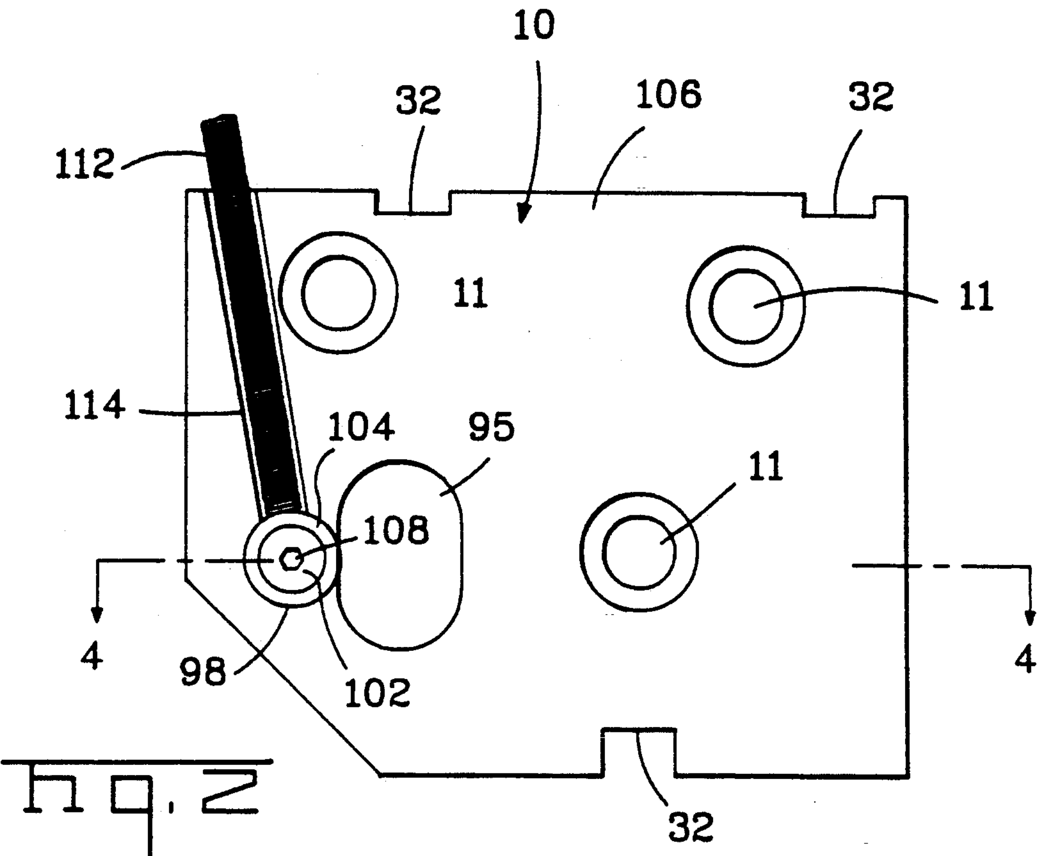
Fig. 2
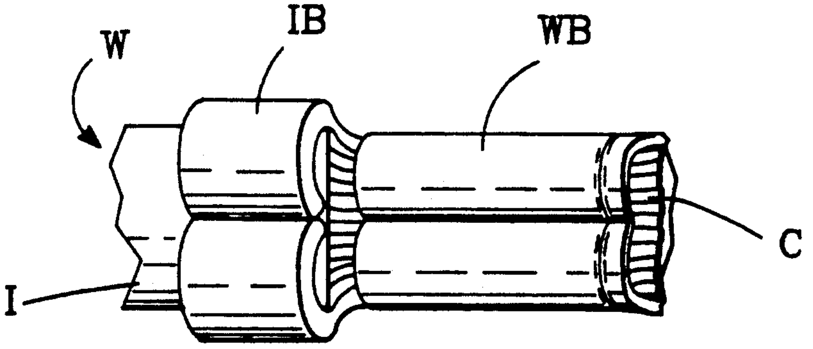
Fig. 7
Fig. 6
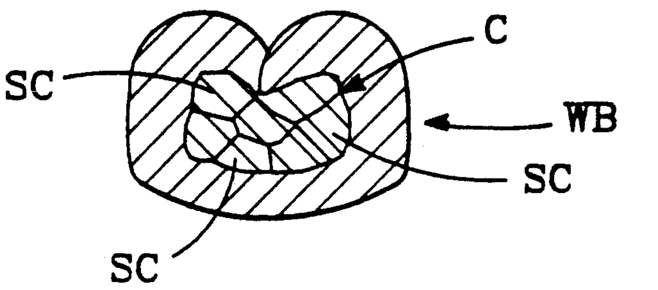

48
50
90
94
C
WB
T
58
49
78
84
I
W
IB 44
84
49
86
92
88
94
5
W
IB
T
CS
WB
S
53
56
60
10
34
32
11
9
8
95
106
110
104
100
96
108
102
58
61
63
98
103

CRIMPED CONNECTOR QUALITY CONTROL METHOD APPARATUS

This application is a continuation of application Ser. No. 07/875,570, filed Apr. 27, 1991, now abandoned, which in turn is a continuation of application Ser. No. 07/621,702, filed Dec. 3, 1990, now abandoned.

FIELD OF THE INVENTION

This invention relates to a method of monitoring the quality of a crimped electrical connection and to apparatus for crimping an electrical terminal to a wire and being provided with means for monitoring the quality of the crimped connection between the terminal and the wire.

BACKGROUND OF THE INVENTION

There is disclosed in DE-A-3737924 a method of monitoring the quality of a crimped connection produced by the application of a compressive force to a crimping barrel of an electrical terminal, with a wire therein, the method comprising the steps of measuring the peak value of the crimping force and comparing the peak value with a reference value.

An effective crimped connection between the crimping barrel and the wire may not be achieved for a variety of reasons. Where the wire is an insulated wire, insulation may not have been completely stripped from the electrically conductive core of the wire or it may not have been stripped therefrom at all with the result that insulation is present, to a greater or a lesser extent, within the crimped barrel. Strands of said core may be absent from the crimped connection because they were broken off or splayed out before the crimping operation. The crimp height of a die and anvil set used in carrying out the crimping operation may have been incorrectly set having regard to the wire gauge or the terminal size, or the die or the anvil may have become worn. Although such faults may in some cases be detected by measuring the peak value of the crimping force and comparing it with a correct reference peak value, not all of these faults, especially where a plurality thereof occur simultaneously, will necessarily cause the peak value of the actual crimping force to vary to a significant extent, as explained in detail hereinafter.

SUMMARY OF THE INVENTION

The present invention proceeds from the realization that not only the peak value of the actual crimping force should be measured for crimp quality control purposes, but also its incremental values and/or the total work performed during the crimping operation.

A method as defined in the second paragraph of this specification is according to the present invention, characterized by the steps of; measuring the incremental values of the crimping force during its application; storing the incremental values in the form of an actual crimping force value envelope; measuring the incremental values of an ideal reference crimping force during its application; storing the latter values in the form of an ideal crimping force value envelope; and comparing said envelopes to determine the quality of the crimped connection.

For optimum accuracy in determining the quality of said connection both the incremental values of said envelopes and the areas defined thereby are simultaneously compared, said areas being proportional to the total work performed.

A signal may be arranged to be automatically generated to indicate the result, either favorable or unfavorable, of the comparisons.

There is also disclosed in DE-A-3737924, apparatus for crimping an electrical terminal to a wire, the apparatus comprising a crimping die, a crimping anvil, means for driving the die through cycles of operation each comprising a working stroke towards the anvil to crimp a terminal thereon to a wire and a return stroke away from the anvil; and a load cell for measuring the value of the crimping force applied to the terminal during each cycle of operation.

For reasons which will be apparent from the foregoing, apparatus according to the present invention is characterized by means for continuously measuring the position of the said die during each cycle of operation, means for sampling and holding the results of said measurements to produce an actual crimping force value envelope, a comparator for comparing said actual envelope with an ideal crimping force value envelope, and means for producing a signal indicative of the result of said comparison and thus of the quality of the crimped connection between the terminal and the wire. Said measuring means may be in the form of an incremental encoder driven by an electric motor of the drive means.

The comparator may comprise respective parts for comparing the incremental values of said envelopes, the peak values of said envelopes and the areas defined by said envelopes, for optimum accuracy of evaluating the quality of the crimped connection.

In the event that the comparison reveals a fault of predetermined significance in the crimped connection, the signal may be arranged to disable the drive means of the apparatus so that it cannot be started again until the fault has been investigated and cleared. Where the apparatus is one of a plurality of such apparatus incorporated in a lead making machine and being automatically fed with wires thereby, the signal may be arranged to order the apparatus to carry out a test program by performing a predetermined number of further crimping operations, store the actual crimping force envelopes so produced and average them to determine whether the fault still exists. The signal may also be arranged to cause the apparatus to alter its crimp height where that is appropriate.

BRIEF DESCRIPTION OF THE DRAWINGS

For a better understanding of the invention and to show how it may be carried into effect reference will now be made by way of example to the accompanying drawings in which:

FIG. 2 is an underplan view of a mounting plate of the press, for securing an electrical terminal applicator thereto;

FIG. 6 is an enlarged cross-sectional view, drawn from a section photograph, through a wire barrel of the terminal when the barrel has been correctly crimped to the wire;

FIG. 8 is a theoretical diagram illustrating the measurement of the actual crimping force exerted on the terminal by the applicator, by means of an incremental encoder and a load cell;

FIG. 9 is a theoretical diagram illustrating means for the comparison of three aspects of the measured actual crimping force, with an ideal crimping force envelope;

DETAILED DESCRIPTION OF THE INVENTION

Figure 1:
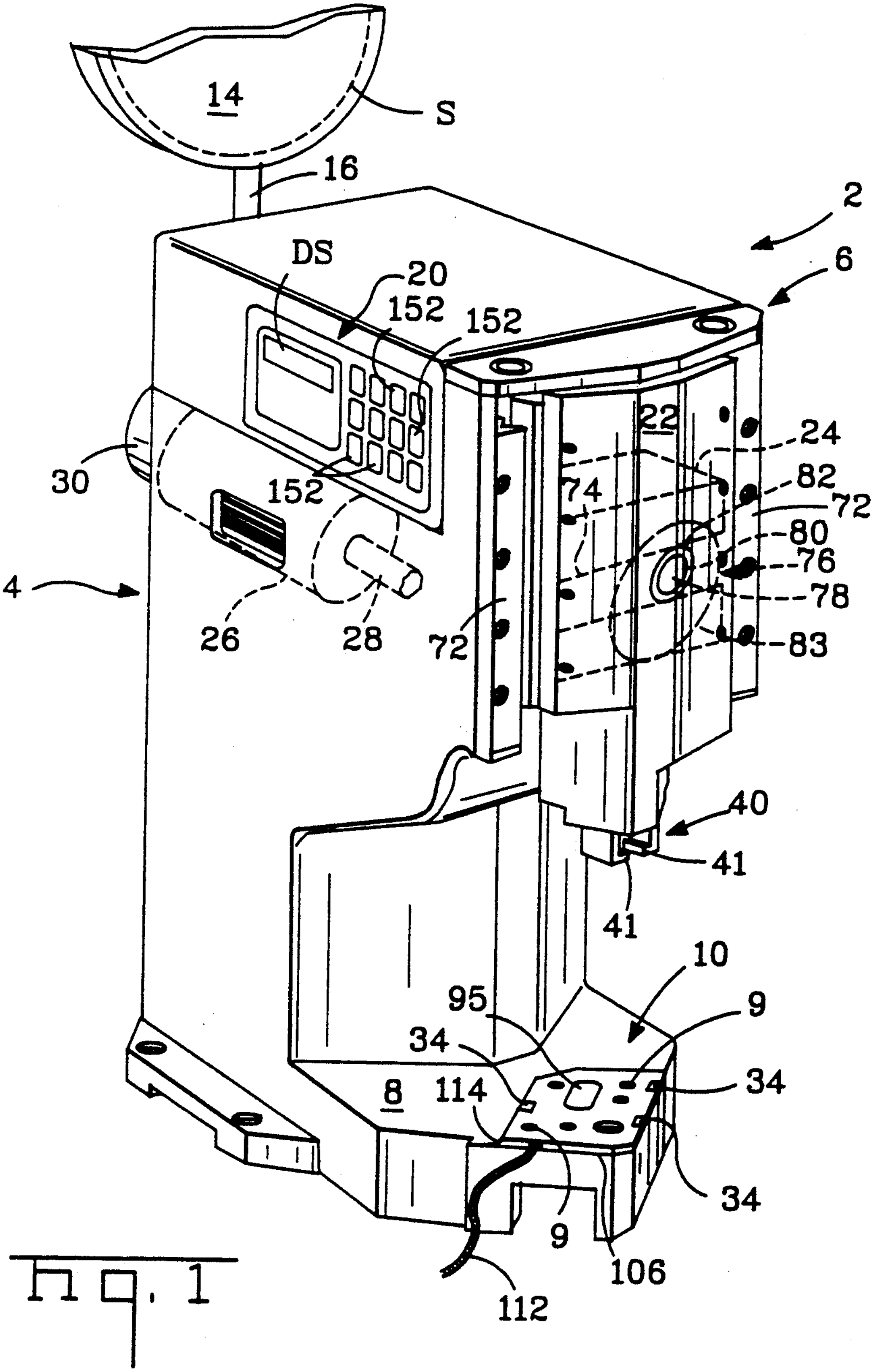
FIG. 1 is an isometric view of an electronically controlled crimping press having a slide ram driven by an eccentric assembly.
Figure 3:
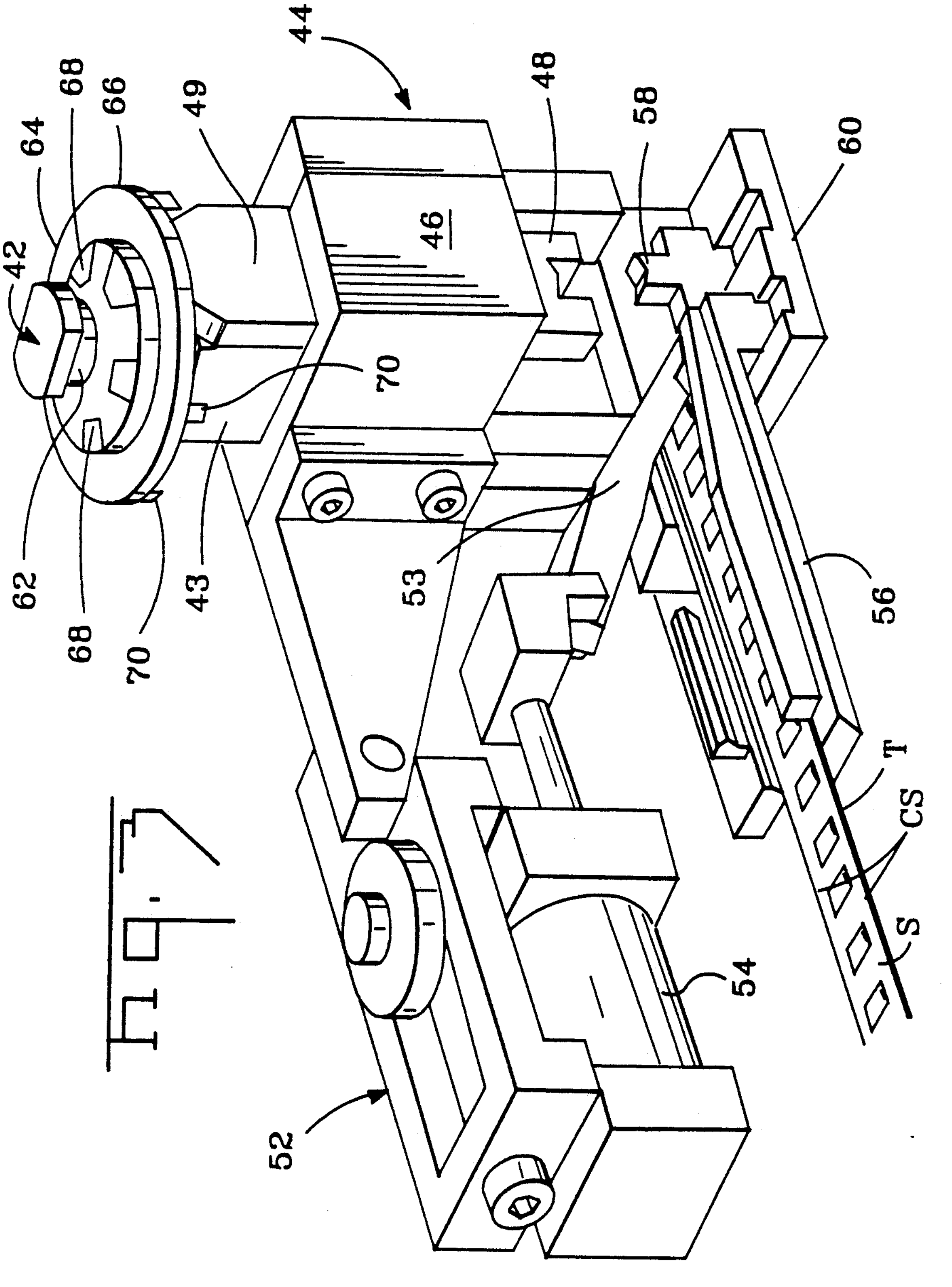
FIG. 3 is a diagrammatic isometric view of the terminal applicator.
Figure 4:
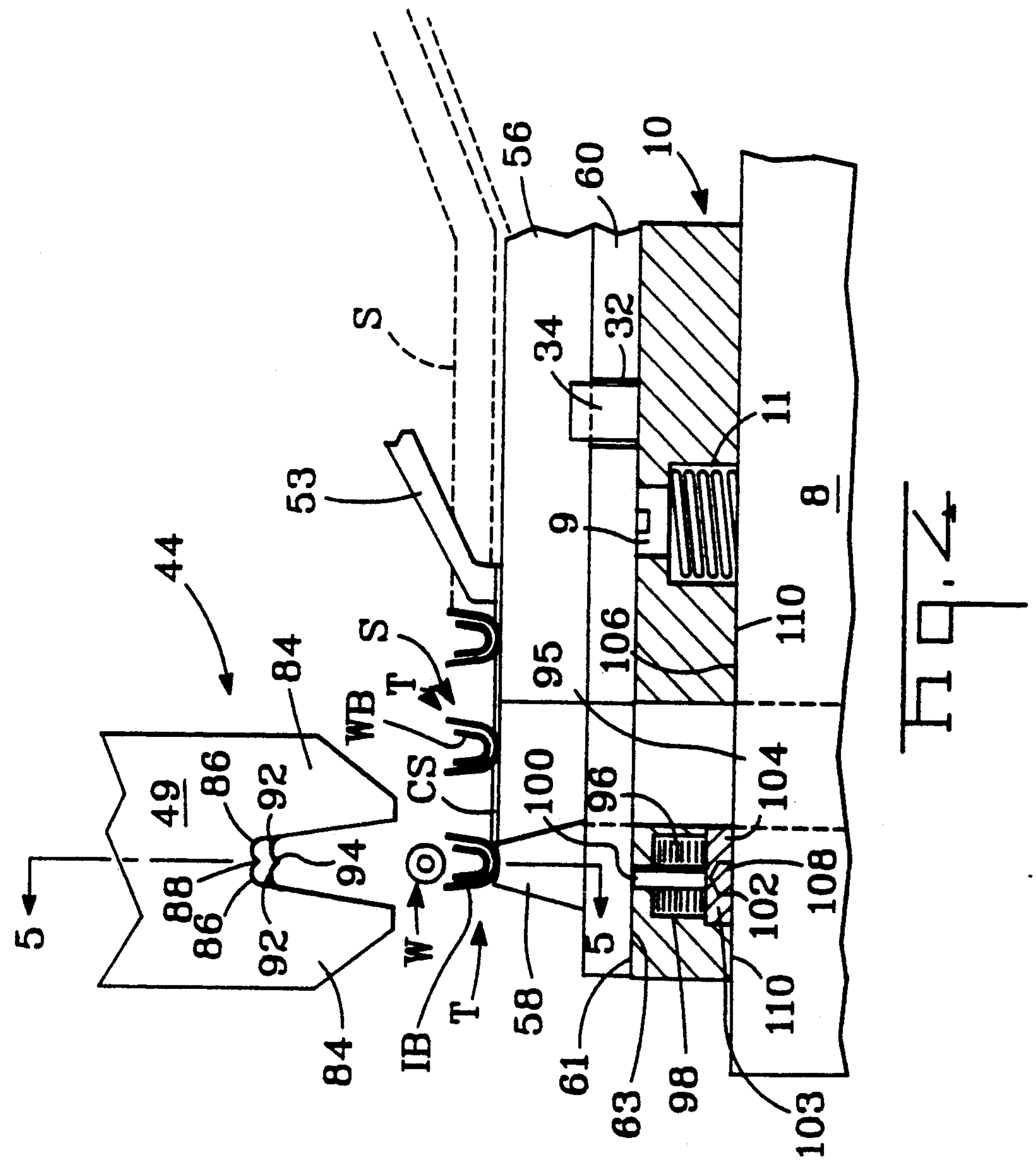
FIG. 4 is an enlarged, fragmentary, diagrammatic front view showing the applicator mounted to the press and an electrical terminal about to be crimped to an insulated wire by the applicator, the mounting plate being shown in section on lines 4—4 of FIG. 2.

As shown in FIGS. 1, 2 and 4 an electronically controlled crimping press 2 comprises a cast metal frame 4 having a generally rectangular ram drive housing 6, a pedestal 8 formed integrally therewith and an applicator mounting plate 10 secured to the pedestal 8 by means of fasteners 9 passed through holes 12 in the plate 10. A rotary, terminal strip storage reel 14 (shown in fragmentary form in FIG. 1) is supported on a vertical shaft 16 on the press 2 and has wound thereabout a strip S (FIGS. 3 and 4) of electrical terminals T joined together by means of carrier strips CS. On one side thereof, the housing 6 has a control panel 20 for use in operating the press 2 by way of a control circuit 122 which is shown in FIG. 17. Arranged for vertical sliding movement in the forward part of the housing 6 is a slide ram 22 which is connected by way of a reduction gearbox 24 to a 3-phase, brushless, maintenance free, DC synchronous electric drive motor 26 in the housing 6. The motor 26 has an output shaft 28 to one end of which is connected an incremental encoder 30 fixed to the motor 26, the other end of the shaft 28 being connected to the gearbox 24.

Figure 5:
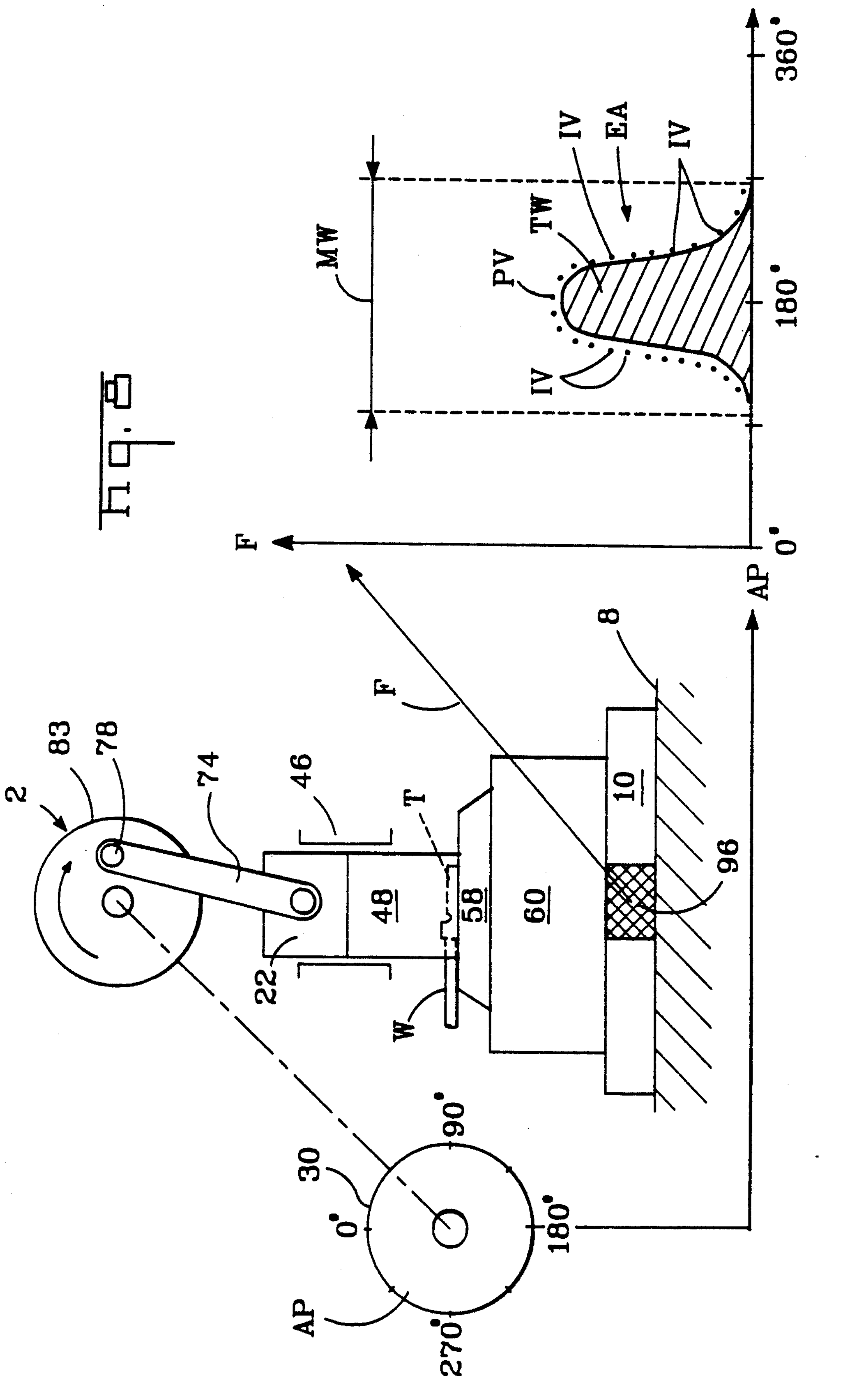
FIG. 5 is a view taken on the lines 5—5 of FIG. 4.
Figure 7:
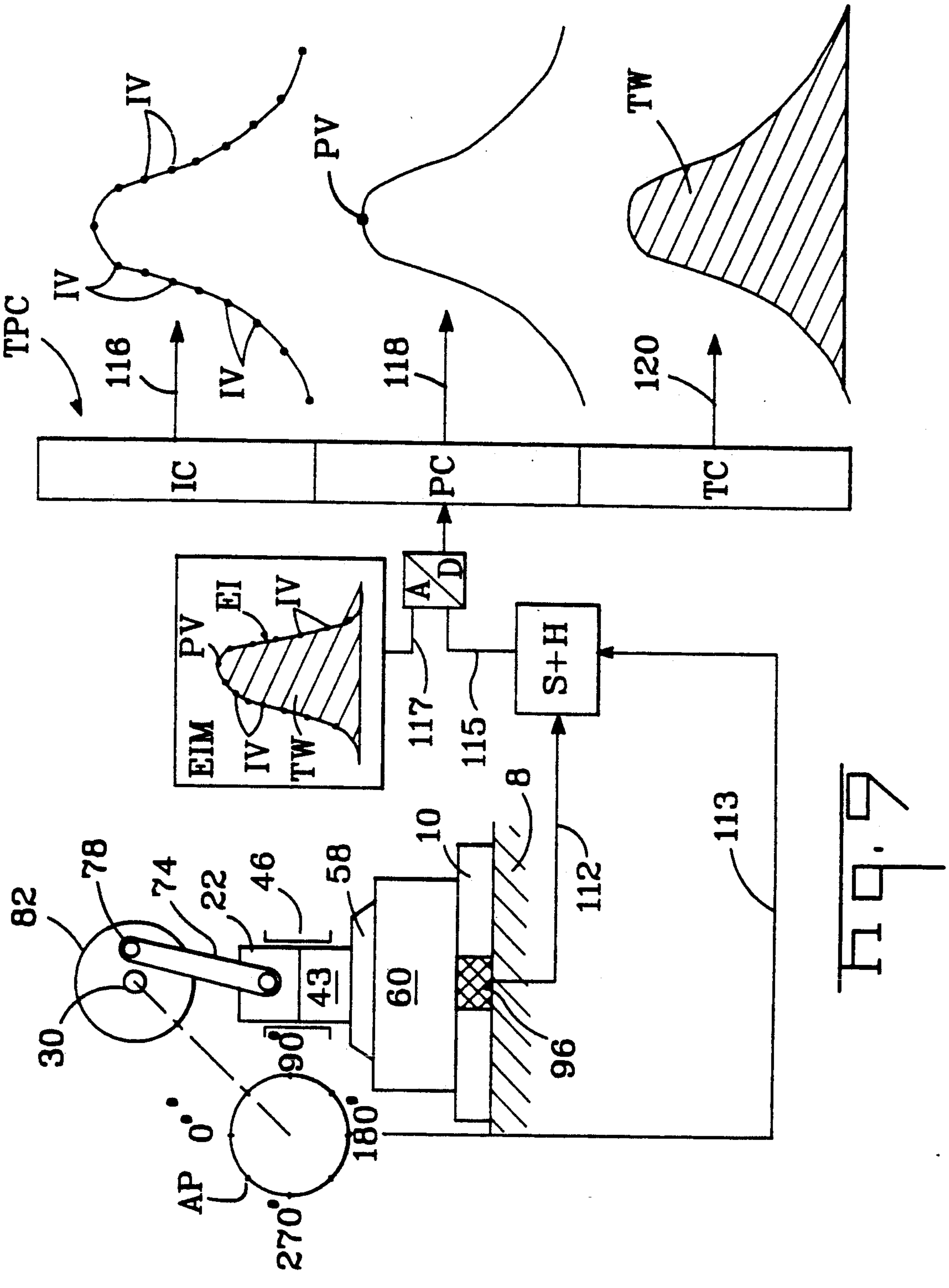

The applicator mounting plate 10 has lateral notches 32 in which are secured applicator mounting lugs 34 (FIGS. 1 and 4). The slide ram 22 has, fixed to its lower end, an adaptor 40 comprising a pair of inturned claws 41 for releasably securing the ram 22 to a complementary adaptor head 42 of the applicator ram 43 of an electrical terminal applicator 44 (FIGS. 3 to 5), the ram 43 being slidably mounted for vertical reciprocating movement in a ram housing 46 of the applicator 44. The ram 43 terminates at its upper end in the adaptor head 42 and at its lower end in a crimping die assembly 48 comprising, as shown in FIG. 4 and 5, an insulation barrel crimping die 49 behind which is a wire barrel crimping die 50. The applicator 44 has a terminal strip feeding device 52 comprising a feed finger 53 driven in horizontal reciprocating movement by means of a pneumatic drive unit 54, to draw the strip S from the reel 14 along a feed track 56 towards a terminal crimping anvil 58 on the upper surface 59 of an applicator base plate 60 secured to the mounting plate 10 by means of the lugs 34 with the bottom surface 61 of the plate 60 in surface-to-surface contact with upper surface 63 of the plate 10.

The adaptor head 42 is in the form of a radial flange mounted on a vertical shaft 62. According to the teaching of U.S. Pat. No.-A-3,184,950, which is incorporated herein by reference, there are mounted for rotation about the shaft 62, a first calibrated disc 64 for use in adjusting the crimp height of the die 50 and a second calibrated disc 66 for adjusting the crimp height of the die 49, that is to say the discs 64 and 66 are for adjusting the shut height of the respective dies. The disc 64 has, as shown in FIG. 3, a ring of abutments 68 on its upper face, extending around the shaft 62, the abutments 68 being of different heights and being selectively engageable with the lower faces of the claws 41, when the adaptor head 42 is positioned therebetween to couple the rams 22 and 43, thereby to adjust the distance between the rams, and thus the effective length of the die 50. The disc 66 has on its underside, a ring of abutments 70 which are selectively interposeable between the discs 66 and the upper end of the die 49 in order to select its effective length. The ram 22 is mounted to the housing 6 by means of a roller or ball bearings 72. As indicated by broken lines in FIG. 1, the ram 22 is formed with a horizontal rectilinear guideway 74 which opens into its rear face only, and receives an eccentric assembly 76 comprising a stub shaft 78 which is mounted for rotation about its own axis in a roller-bearing ring 80 which is in turn mounted in a roller 82. The shaft 78 is eccentrically mounted on an output shaft 83 arranged to be driven in rotation by the motor 26 through reduction gearing in the gearbox 24. The motor 26 has a control circuit for ensuring that each time the motor 26 is actuated by means of a switch on the control panel 20, it drives the shaft 83 only through a single revolution. Following each revolution of the shaft 83, the press ram 22, and thus the applicator ram 43, are driven through a downward working stroke and an upward return stroke, the eccentricity of the shaft 82 being taken up by the movement of the roller 82 along the guideway 74.

The die 49 comprises spaced legs 84 diverging from arcuate forming surfaces 86 merging at a central cusp 88, the die 50 having a pair of spaced legs 90 which diverge from a pair of arcuate forming surfaces 92 merging at a central cusp 94.

Figure 7:
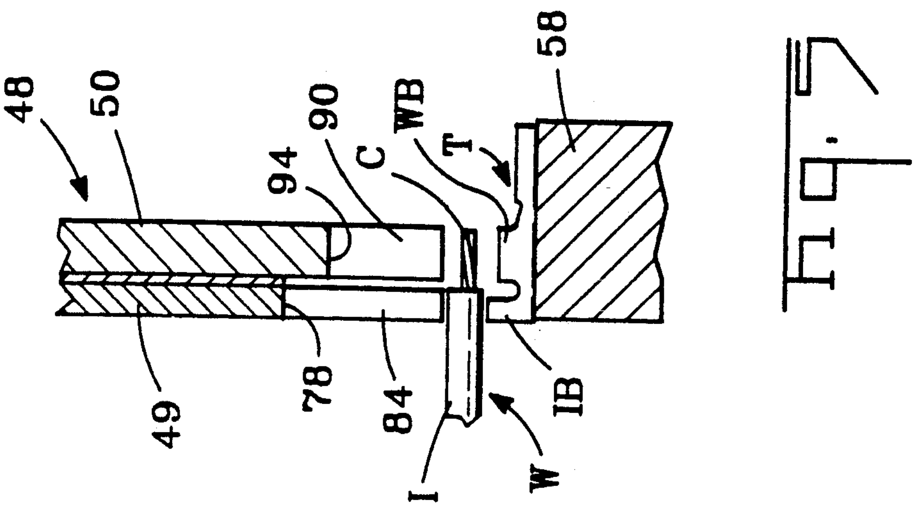
FIG. 7 is an enlarged fragmentary plan view showing the terminal when it has been crimped to the wire.

Each terminal T has an open, U cross-section insulation barrel IB and a somewhat lower and longer U cross-section open wire barrel WB. Before each working stroke of the ram 43, the end portion of an insulated electrical wire W, the insulation I of which has been stripped to expose a short length of the multi-stranded metal core C of the wire W (as shown in FIG. 5) is inserted between the leading terminal T on the anvil 58, and the dies 49 and 50 when the press ram 22 is in its raised, top dead center position. Towards the end of the downward, working stroke of the ram 22, the forming surfaces 86 of the die 49 curl over the upstanding ears of the insulation barrel IB about the insulation I of the wire W and drive the ends into the insulation, forming surfaces 92 of the die 50 curling over the upstanding ears of the wire barrel WB abut the core C and wrapping them thereover (FIGS. 6 and 7). The crimping force applied to the barrel WB by the die 50, normally amounts to some two tons at peak load so that the barrel WB and the core C are cold forged to produce an integral mass of the strands SC of the core C voidlessly filling the crimped wire barrel WB as shown in FIG. 6 which shows an ideal crimped connection between the barrel WB and the core C. During the crimping operation, the leading terminal T is sheared from the carrier strips CS by shear members (not shown) associated with the die assembly 48 and the anvil 58, the scrap, so formed, being discharged through a scrap shoot 95.

An effective crimped connection between the wire W and the terminal T may, for a variety of reasons, not be achieved. Insulation I may not have been completely stripped from the core C or it may not have been stripped therefrom at all, with the result that insulation is present, to a greater or to a lesser extent within the crimped wire barrel WB so as to impair the integrity of the electrical connection between the core and the terminal, the insulation gradually being extruded when the terminal 10 is in use, so that voids develop in the crimped connection, thus allowing the ingress of moisture or fouling thereinto, and causing the connection to loosen.

Strands SC of the core C may be absent from the crimped connection, because they were broken off during the stripping operation or because they were splayed as a result of incorrect insertion of the core into the wire barrel. The absence of more than a proportion of the strands, more than one wire in the case of seven strand wire, from the wire barrel will result in the crimped connection being undesirably loose and/or of undesirably low conductivity.

The setting of the disc 64 or disc 66 may have been incorrect having regard to the gauge of the wire W so that the wire barrel and/or the insulation barrel are over-compressed or under-compressed as the case may be, under-compression leading to loose connection, and over-compression to damage to the wire core strands.

The correct crimping of terminal T may also be affected by die or anvil wear or by the terminal T and the wire W being of incompatible sizes.

Although the faults outlined above, may be in some cases detected by measuring the peak value of the crimping force and comparing it with a correct reference peak value of that force, not all of the faults, especially when a plurality of these faults occurs simultaneously, will necessarily cause the peak value of the crimping force to vary to a significant extent, and this may well be the case, for example where one of the faults results in the peak value of the crimping force being increased and another in it being reduced. Therefore, not only the peak value of the crimping force should be measured for fault detecting purposes, but also its incremental values as the crimping operation proceeds, and/or the total work performed by the die assembly.

For continuously measuring a pre-determined portion of the crimping force, continuously during each crimping operation, a load cell 96, preferably a piezoelectric crystal, is snugly received in an opening 98 in the applicator mounting plate 10, as best seen in FIG. 4, so as to be directly below the anvil 58 when the applicator 44 has been assembled to the plate 10. The cell 96 is secured in the opening 98 by means of a mounting screw 100, the lower surface of the head 102 of which is flush with the lower surface of a clamping ring 104 which surface is in turn flush with the lower surface 106 of the plate 10, and was accurately machined to this end. The screw head 102, which is frusto-conical, and is snugly received in a frusto-conical central opening 103 in the clamping ring 104, is formed with a central hexagonal kerf for receiving a screw driver blade. For effective force transmission the plate 10 is secured to the pedestal 8 so that there is no space between the lower surface of the ring 104 and the upper surface 110 of the pedestal 8. The pedestal 8, the mounting plate 10 and the base plate 60 thus provide a solid metal structure enclosing the cell 96. The load cell 96 is connected to a shielded outlet lead 112 which extends through a groove 114 in the lower surface 106 of the plate 110 as shown in FIGS. 1 and 2.

The output of the load cell 96, which measures only a proportion of the crimping force, is proportional to the crimping force as it is applied to the terminal T during each crimping operation, during the end portion of the downward working stroke of the ram 22, and during the initial part of its return stroke. The output of the encoder 30 which is driven by the shaft 28 of the motor 26 is proportional to the angular position of the stub shaft 78 about the axis of the output shaft 83, and thus to the vertical position of the ram 22 and of the die assembly 48.

The theoretical diagram of FIG. 8 indicates how the incremental encoder 30 cooperates with the load cell 96 to produce an actual crimping force envelope EA by plotting the actual crimping force F applied by the die assembly 48 to a terminal T on anvil 58, against the angular position AP of the stub shaft 78. The envelope EA which is derived from the incremental values IV of the force F is generated within a measuring window MW over approximately 45° either side of the bottom dead center position (180°) of the ram 22, that is to say in the angular positions of the shaft 78 during which the die assembly 48 is in contact with the terminal T, the peak value PV of the force F being attained at least proximate to said bottom dead center position of the ram 22. The hatched space TW defined by the envelope EA therewithin, is proportional to the total work performed the die assembly 48.

As shown in the theoretical diagram of FIG. 9, the outlet lead 112 of the cell 96 and the outlet lead 113 of the encoder 30 are connected to a sample and hold circuit S+H which samples and holds signals representing the increments of the force F and the angular positions AP of the shaft 78, so that a complete envelope EA is entered in the circuit S+H. The operator enters an ideal, reference, crimping force envelope EI into an ideal envelope memory EIM, the envelope EI being obtained, by using an applicator 44 which is in optimum condition with a die assembly 48 and an anvil 58, also in optimum condition, to crimp several terminals T, in this example eight terminals, which are also in optimum condition, to wires W of the correct gauge for the terminals and the end portions of which have been correctly stripped of insulation; to provide respective envelopes EA with the aid of an incremental encoder and a load cell, as described above. The crimped connections between the wires and the terminals are then inspected to ascertain that none of the connections between the wires and the terminals is faulty. If all the connections are good, the average of the eight envelopes EA is then taken and is entered into the memory EIM as the ideal envelope EI. The outlets 115 and 117, respectively, of the circuit S+H and the memory EIM are connected by way of an analog-to-digital converter A/D, to a three part comparator TPC, having a first part IC for comparing the incremental values IV of the actual crimping force F with those of the ideal envelope EI, a second part PC for comparing the peak value PV of the actual crimping force F with that of the ideal envelope EI, and a third part TC for comparing the total work TW, namely the area within the envelope EA with that of the ideal envelope EI. The comparison effected in the comparator part IC is applied to an outlet when one 116 thereof, that effected by the comparator part PC is applied to an outlet 118 thereof and that effected by the comparator part TC is applied to an outlet 120 thereof.

Figure 10:
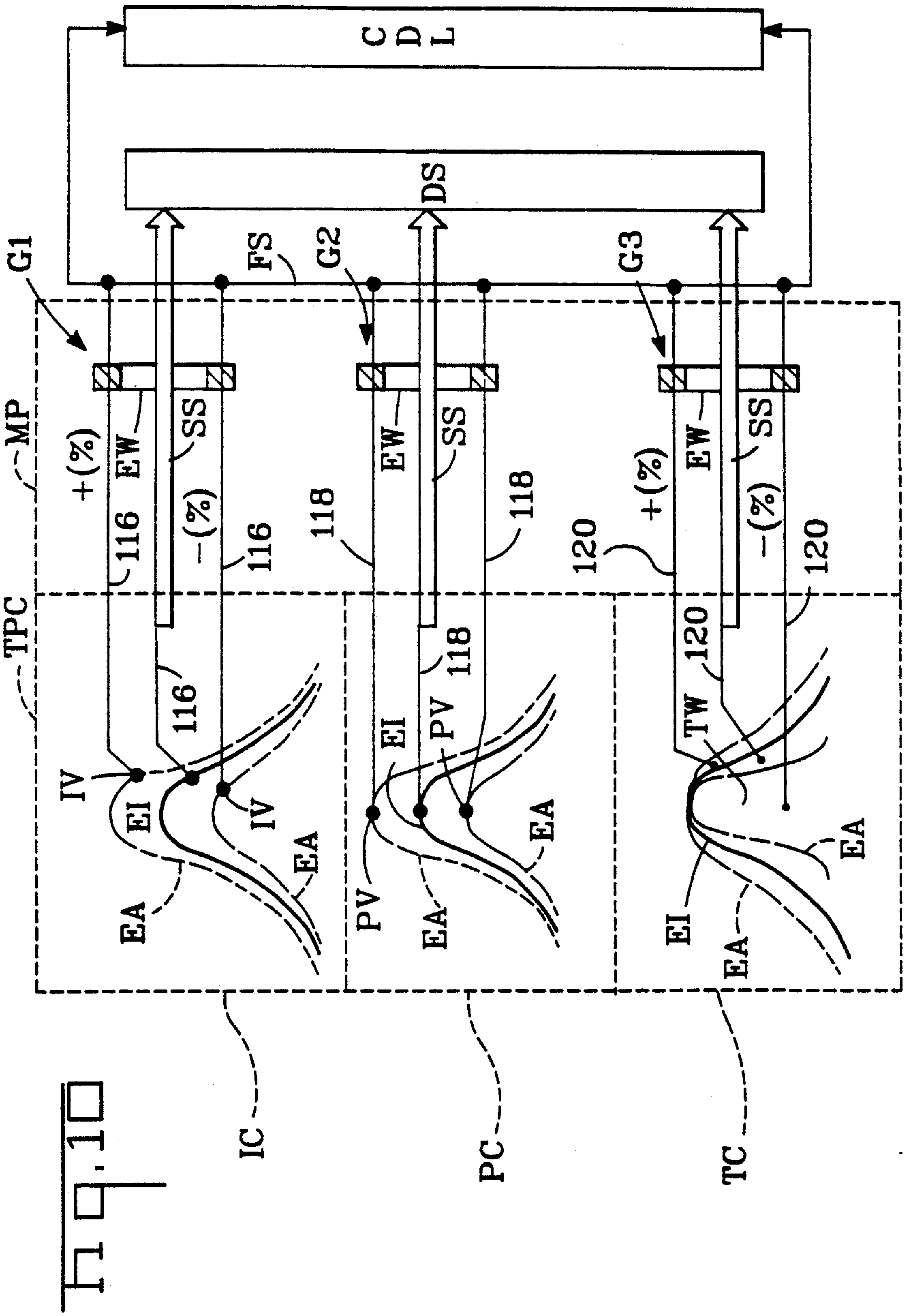
FIG. 10 is a theoretical diagram illustrating means for the determination of permissible threshold values of said three aspects of the measured actual crimping force in comparison with corresponding values of the ideal crimping force envelope.

As shown in the theoretical diagram of FIG. 10, outlets 116,118 and 120 of the comparator TPC are connected to a main microprocessor MP of the press 2, having gating means G1 to G3 associated with the comparator parts IC, PC, TC, respectively, each of these gating means defining an evaluation window EW defining upper and lower thresholds for the digital signals emitted by the respective comparator parts. If a predetermined percentage, for example 5% or 10%, of the signals occurring on the outlet 116 of the comparator part IC lies beyond the upper or the lower threshold of the gate means G1 in respect of a cycle of operation of the press 2, the microprocessor MP applies a failure signal FS to a motor drive control digital logic circuit CDL of the press 2, instructing that circuit to disable the motor 26 so that the press 2 cannot again be operated until it has been re-activated following investigation of the fault giving rise to the signal FS. If the percentage of signals on the outlet 116, falling between the upper and lower thresholds of the gating means G1 so as to pass through its window EW, exceeds a predetermined percentage, for example 90% or 95%, the microprocessor MP applies a success signal SS to a display screen DS of the control panel 20 of the press 2, instructing it to indicate that the crimping operation has been successfully performed. The comparator part IC compares the whole shape of the actual envelope EA with that of the ideal envelope EI, point by point, such points numbering 110 points, for example.

If the peak value PV of the actual envelope EA, as compared with that of the ideal envelope EI by the comparator part PC, lies beyond either the upper or the lower threshold of the gate means G2, then the microprocessor MP applies the failure signal FS to the control circuit CDL. The microprocessor applies the success signal SS to the screen DS if said peak value lies within the window EW of the gate means G2.

If the area defined within the actual envelope EA, that is to say the total work TW, as compared by the comparator part TC with the area TW defined by the ideal envelope EI, produces a difference of more than a predetermined percentage, for example 5% or 10%, so that the signal applied to the outlet 120 lies beyond the upper or lower threshold defined by the window EW of the gate means G3, the microprocessor MP applies the failure signal FS to the control circuit CDL. If, however, the signal applied to the outlet 120 lies within the window EW of the gate means G3 the microprocessor MP applies the success signal SS to the display screen DS.

The control circuit CDL is actuated to disable the press motor 26 in the event that it receives a failure signal FS in respect of the comparison effected by any one of the comparator parts IC, PC or TC. The display screen DS, however, is not actuated to indicate success, unless it receives a success signal SS in respect of the comparisons effected by all of the comparator parts IC, PC, TC.

As explained in greater detail below, where the press 2 is part of an automatic lead making machine, stripped wires W being automatically fed to the applicator 44, the failure signal may be arranged to cause the microprocessor MP to order the press to cause the applicator to eject the faulty crimped connection therefrom and to carry out a test program, whereafter the press will only be disabled if the test program reveals further faulty connections.

The effects of some common faults which arise in crimping operations, upon the actual envelope EA, will now be described with reference to the graphs of FIGS. 11 to 15.

Figure 11:
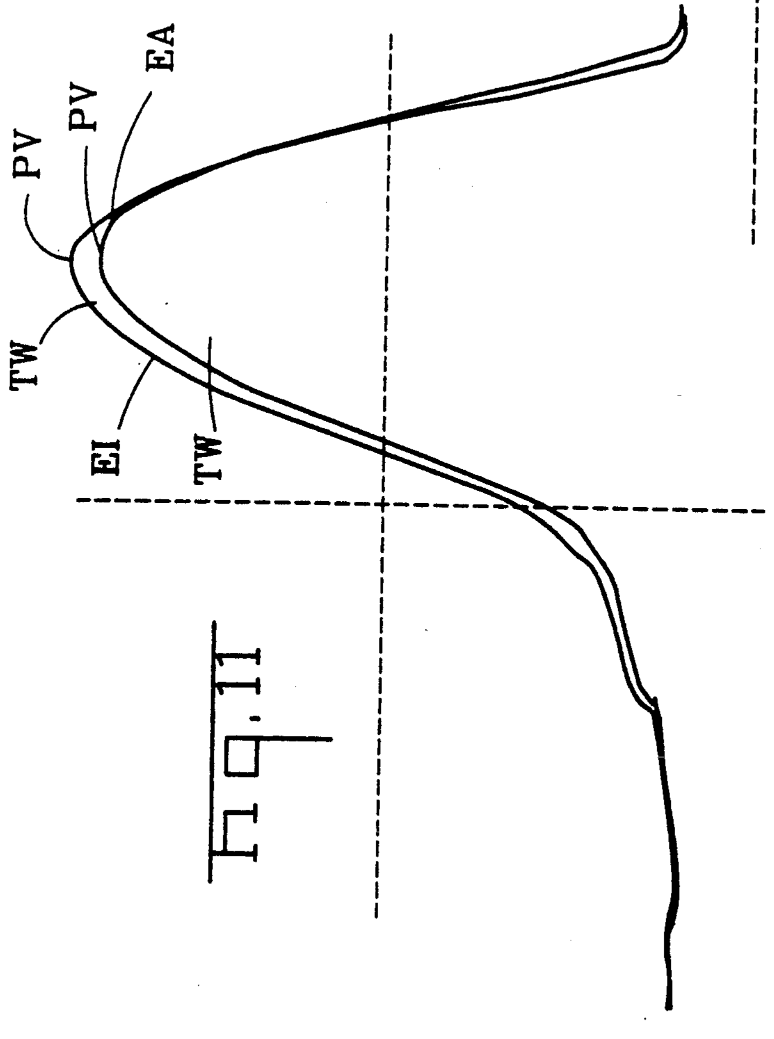

FIG. 11 illustrates the case where two of the seven strands SC of the core C of the wire W have not entered the wire barrel WB of a terminal T on the anvil 58, these strands having, for example, been broken off when the insulation I was stripped from the core C or having been splayed out as a result of a faulty insertion the core C into the wire barrel WB. As shown in FIG. 11, the peak value PV of the envelope EA lies slightly below that of the ideal envelope EI to an extent which may not fall below the lower threshold of the gate means G2 so that no failure signal FS would thereby be generated. Bearing in mind, however, that the total work TW defined by the envelopes EA and EI will in each case be an integral of the envelope outline, so that the comparison effected by the comparator part TC will reveal very small defects, the microprocessor MP will originate a failure signal FS. The absence of only one strand SC from the barrel WB will not significantly effect the integrity of the crimped connection and so may be ignored.

Figure 12:
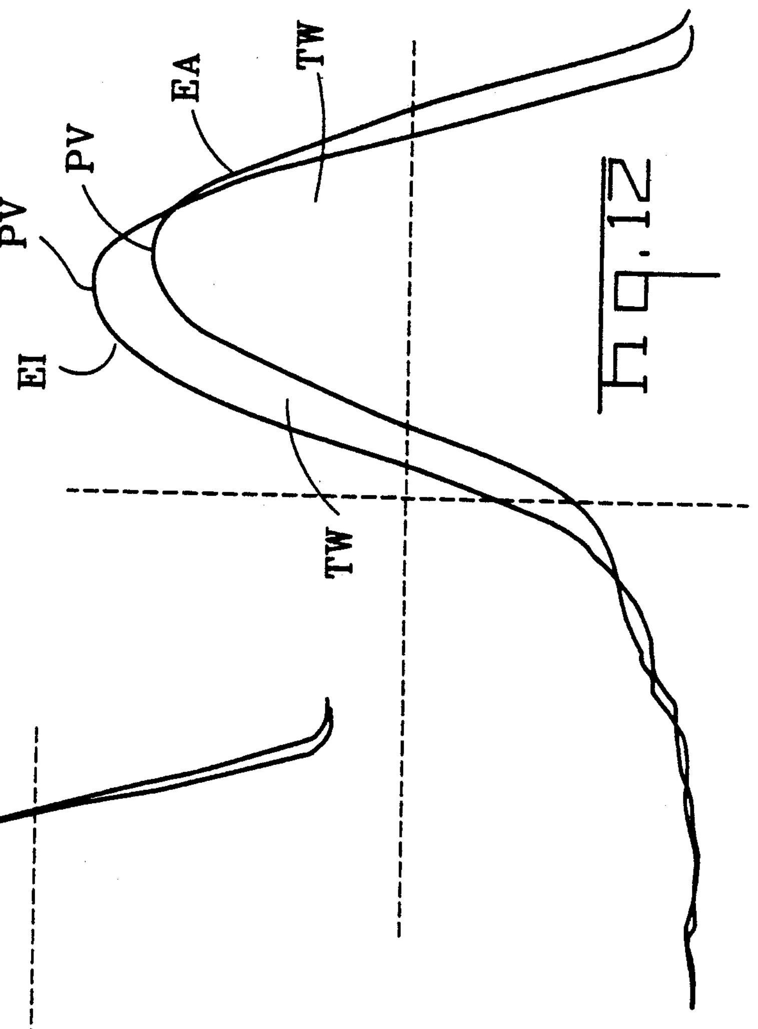
FIG. 11 to 15 are graphs illustrating exemplary comparisons between the ideal crimping force envelope and the actual crimping force envelopes, produced by said measurement, where different respective faults in the crimping operations have occurred.

FIG. 12 illustrates the case where three of the seven strands SC were absent from the wire barrel WB, the peak value PV of the actual envelope EA being significantly lower than that of the envelope EI than in the case illustrated in FIG. 11. Since both the shape and the total work TW in respect of the envelopes EA and EI differ significantly, a failure signal FS would be originated in respect of the comparisons made by all three of the comparator parts IC, PC and TC.

Figure 13:
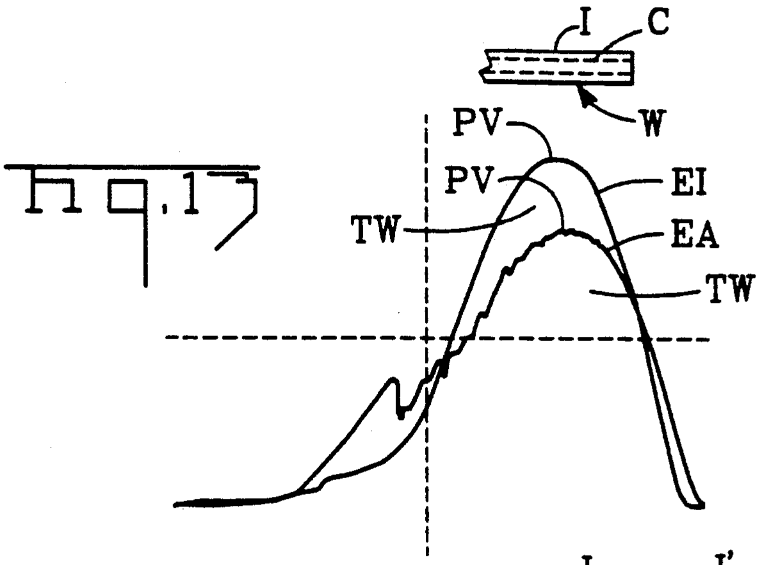

As shown at the top of FIG. 13, no insulation has been stripped from the core C of the wire W. As a result of this, envelope EA, in fact the force F, initially rises substantially as the insulation I is engaged by the die 50 as shown towards the left in FIG. 13. The peak value PV of the envelope EA is, however, significantly low with respect to that of the envelope EI, because the die 50 causes the relatively soft insulation to be extruded from the wire WB. Although the peak value PV and the incremental values IV of the envelopes EA and EI differ significantly, so that failure signals FS would be initiated as a result of the comparisons made by the comparator parts IC and PC, the total work defined by these envelopes does not significantly differ, so that neither threshold of the gate means G3 would be traversed.

Figure 14:
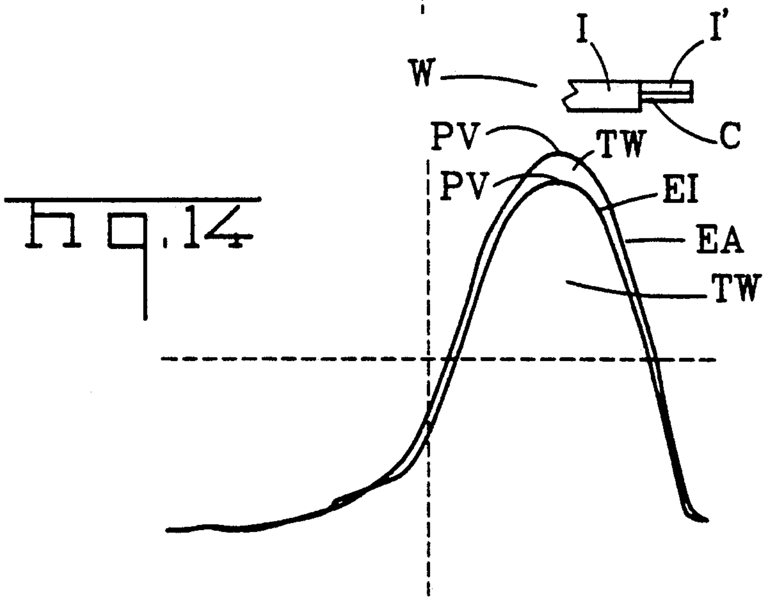

As shown at the top of FIG. 14, a sliver I' of insulation remains on the core C and extends therealong over its full length so that the presence of this sliver I' in the wire barrel WB, along with the core C, causes both the peak value PV and the total work TW of the envelope EA to be increased beyond those of the envelope EI. Even if the percentage difference between the values PV the values IV of the envelopes EA and EI were insufficient to cause the initiation of failure signals FS the difference between the total work TW of the envelopes EA and EI would cause a failure signal FS to be initiated.

Figure 15:
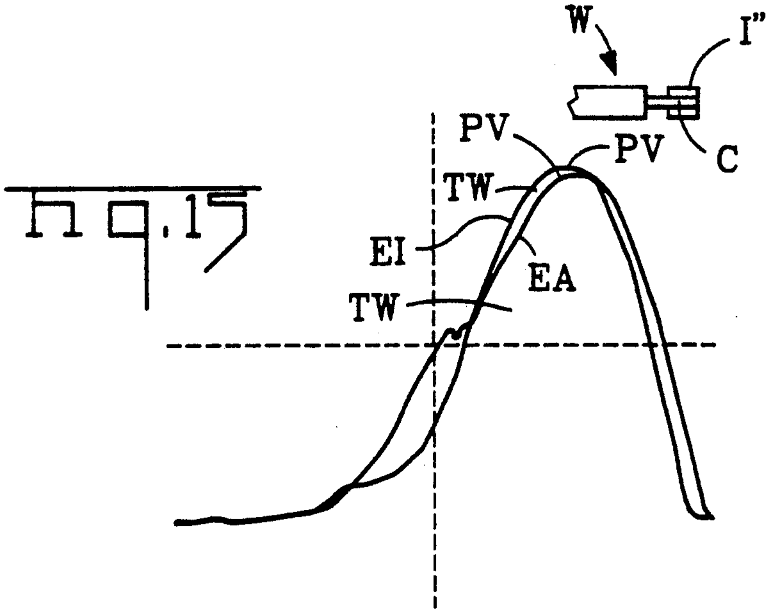

As shown at the top of FIG. 15, a length I" of insulation remains partially on the core C of the wire W. In this case, the total work TW may be substantially equal in the case of the envelopes EI and EA, the difference between the peak values PV thereof being very small. However, the shapes of the envelopes differ very substantially so that the comparison made by the comparator part IC will initiate a failure signal FS.

It is of course possible for wire strand, and insulation faults to occur simultaneously or for one or more strands to be broken off during the crimping operation and for die or anvil wear to cause variations in the crimping force F, so that it cannot be predicted in advance as to how the envelope EA will be affected, especially where a plurality of faults occurs simultaneously. It is, therefore, preferable for all three modes of comparison to be employed, although the TW comparison may be omitted if extreme accuracy in fault detection is not needed. It will be apparent, however, from the foregoing, that to compare peak values alone can, under various circumstances, result in quite substantial faults remaining undetected.

Figure 16:
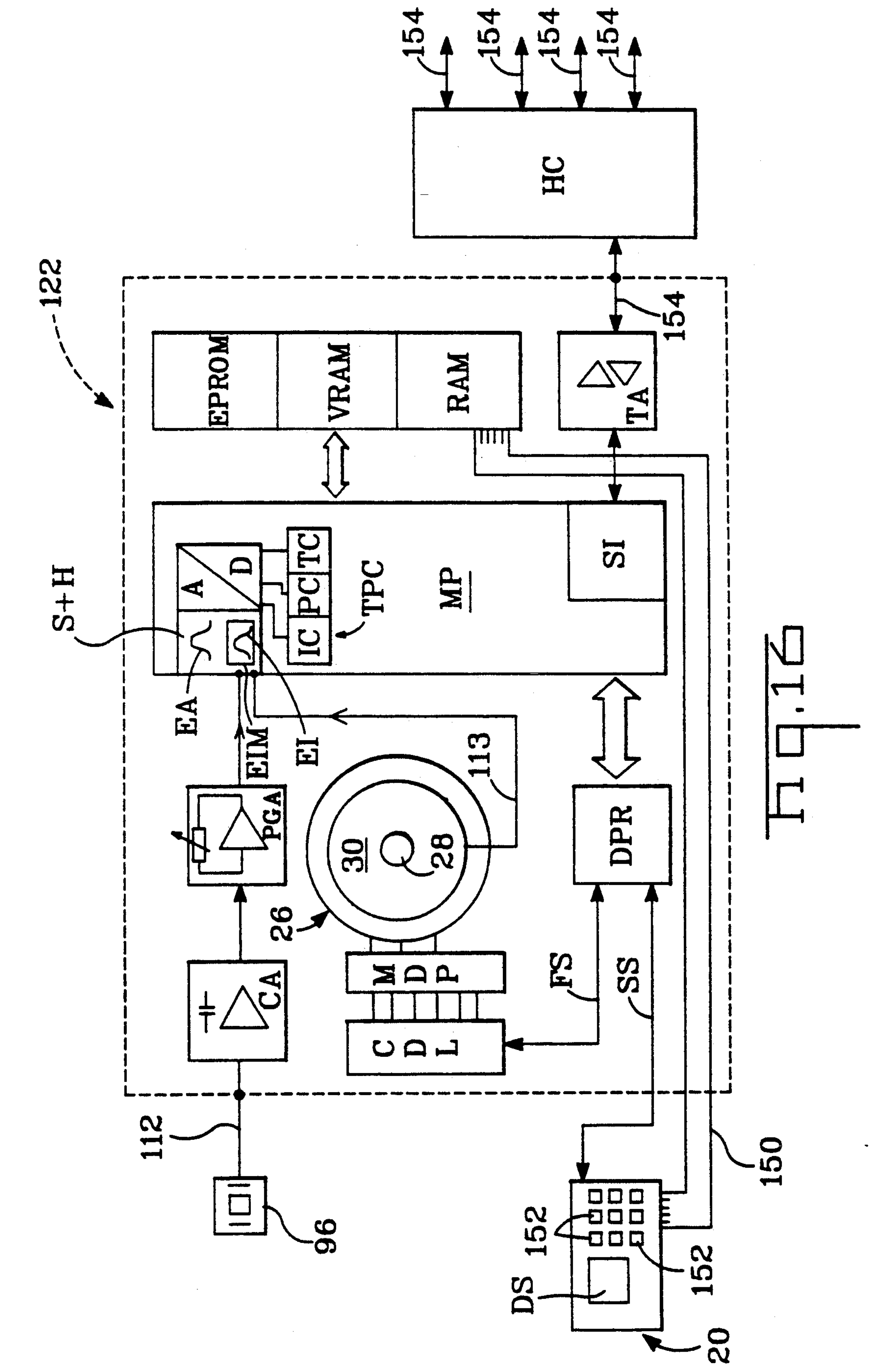
FIG. 16 is a block schematic diagram of an electronic circuit arrangement for effecting the said comparisons and for controlling the press accordance with the results thereof.

The press control circuit arrangement 122 which incorporates the crimped connection quality control means described above will now be described with reference to FIG. 16. The circuit arrangement 122 is incorporated in the press 2. The outlet lead 112 of the load cell 96 is connected to the sample and hold circuit S+H by way of a high impedance-to-low-impedance charge amplifier CA and a programmable gain controlled amplifier PGA to ensure adequate output signal strength. As shown, the circuit S+H, the analog-to-digital convertor A/D and the three part comparator TPC are incorporated in the main microprocessor MP of the press 2, as shown. The microprocessor MP is connected to the control panel 20 and to the control digital logic circuit CDL of the motor 26 by way of a dual port ram RAM DPR which receives the comparison information from the microprocessor MP. The circuit CDL is connected to the motor 26 by way of a motor drive pulse generator MDP which supplied three phase DC feed pulses to the motor 26 and which, when ordered to by the circuit CDL can reverse the polarity of the feed pulses supplied to the motor 26 thereby to stop it, upon receipt of a failure signal FS. The control panel 20 is connected to the microprocessor MP by an array of lines 150 and a bank of memories EPROM, VRAM and RAM, and is provided with touch screens 152 which are actuable to cause the microprocessor MP to stop and start the press 2 and to program it to perform various functions, for example to carry out a series of cycles of operation, by way of the microprocessor MP and the circuit CDL and to set the crimp heights of the dies 49 and 50 by means of the discs 54 and 66, these being servo operated.

Where a plurality of presses 2 is incorporated in a lead making machine (not shown), the applicators 44 of the presses 2 being automatically fed with stripped wires W, thereby, the microprocessors MP of the presses 2 and the lead making machine as a whole, are controlled by means of a host computer HC connected to each microprocessor MP by a line 154, a two-way amplifier TA and an interface circuit SI. The microprocessor MP of each press 2, feeds the results of the comparisons made by each comparator TPC to the host computer HC which can thereby monitor the quality of the crimped connections made by the applicator 44 of each press 2. If the host computer HC receives a failure signal FS from a microprocessor MP, the host computer HC signals the microprocessor MP, from which the signal FS emanated, to stop its press 2, to cause its applicator to discard the faulty lead, and the press 2 then to carry out a test program comprising several cycles of operation, for example eight cycles, to average and store the envelopes EA produced by the test program, and to signal the press 2 to continue its operation should the host computer HC find that the averaged envelope compares satisfactorily with the envelope EI.

In appropriate cases, the host computer HC may order the microprocessor MP concerned, to adjust the crimp height of the applicator of the press.

In the case of a grave disparity between envelope EA and corresponding envelope EI, which may indicate that a serious fault has occurred, for example the breakage of a crimping die or the presentation of a wire W of the wrong gauge to the applicator, the host computer HC may order the whole lead making machine to close down, until the fault has been cleared.

We claim:

1. Apparatus for crimping an electrical terminal to a wire, the apparatus comprising a crimping die, an anvil mounting plate, a crimping anvil mounted on said plate, means for driving the die through cycles of operation each comprising a working stroke towards the anvil to crimp a terminal thereon to a wire and a return stroke away from the anvil, load cell snugly confined in an opening in said mounting plate for measuring only a predetermined portion of the value of the crimping force applied to the terminal during each cycle of operation, means for continuously measuring the position of the die during each cycle of operation, means for sampling and holding the results of said measurements to produce an actual crimping force value envelope, a comparator for comparing said actual envelope with an ideal crimping force value envelope and means for producing a signal indicative of the result of said comparison and thus the quality of the crimped connection between the terminal and the wire, and a microprocessor for generating a crimp quality failure signal where the incremental values of the actual envelope differ to a predetermined extent from those of the ideal envelope, the microprocessor having an inlet-outlet line for feeding said failure signal to a host computer and for receiving from the host computer, in response to said failure signal, an instruction to initiate a test crimping program, the microprocessor being responsive to such instruction to actuate the die driving means to carry out the test crimping program, to average and store the actual crimping force envelope produced by the test program and to apply the result of the test program to said inlet-outlet line, for evaluation by the host computer.

2. Apparatus according to claim 1 wherein that said driving means has an electric motor coupled to said die by way of an eccentric assembly, said measuring means having an incremental encoder driven by said motor.

3. Apparatus according to claim 1 wherein the comparator has a third part for comparing the peak values of said actual and ideal envelopes.

4. Apparatus according to claim 1 wherein a drive means control circuit is connected to said signal producing means and is arranged to disable said drive means upon receipt of a crimp quality failure signal from said signal producing means.

5. A method of monitoring the quality of a crimped connection produced by the application of a compressive crimping force to a crimping barrel of an electrical terminal with a wire therein, by means of a crimping die driven along a rectilinear path against said crimping barrel, the method comprising the steps of:

measuring the peak value of the crimping force and comparing the peak value with a reference value;

measuring actual incremental values of the crimping force during its application to the crimping barrel;

storing the actual incremental values in the form of an actual crimping force envelope;

measuring reference incremental values of an ideal reference crimping force during its application;

storing the latter values in the form of an ideal crimping force value envelope;

comparing said envelopes to determine the quality of said crimped connection; generating a crimp quality failure signal where the incremental values of the actual envelope differ to a predetermined extent from the incremental values of the ideal envelope;

applying said failure signal to a host computer;

receiving from the host computer in response to said failure signal, an instruction to initiate a test crimping program; carrying out the test crimping program;

averaging and storing the actual crimping force envelopes produced by the test program to produce an average crimping force value envelope; and signaling the average crimping force value envelope to the host computer for evaluation thereby.

6. Apparatus for crimping an electrical terminal to a wire, the apparatus comprising a crimping die, an applicator plate, a crimping anvil on said plate, a rotary member for driving the die through cycles of operation each comprising a working stroke along a rectilinear path towards the anvil to crimp a terminal thereon to a wire, and a return stroke away from the anvil, a motor for driving said rotary member, a piezo-electric crystal snugly confined on all sides in an opening in said plate, for measuring only a predetermined portion of the value of the crimping force applied to the terminal during each cycle of operation, means for continuously measuring the angular position of the rotary member in turn to measure the position of said die along said rectilinear path, during each cycle of operation, means for sampling and holding the results of both of said measurements to produce an actual crimping force value envelope, a comparator for comparing said actual crimping force envelope with an ideal crimping force value envelope entered into said comparator, a microprocessor for producing a signal indicative of the result of said comparison an thus of the quality of the crimped connection between the terminal and the wire, a logic circuit actuable by the microprocessor to stop, start and control the speed of, the motor, an inlet-outlet line for connecting the microprocessor to a host computer to transmit the said indicative signal thereto for evaluation by the host computer and for receiving instructions therefrom, the microprocessor being responsive to an instruction from the host computer, to actuate the logic circuit to cause the motor to initiate a test crimping program, and to transmit the result thereof to the host computer by way of the inlet-outlet line, for evaluation by the host computer to determine whether the host computer should signal the microprocessor to actuate the logic circuit to stop the motor.

7. Apparatus according to claim 6, wherein said rotary member is a shaft of a DC synchronous electric motor, an eccentric assembly connecting said shaft to a press ram carrying said die, said means for measuring said angular position being an incremental encoder coupled to said shaft.

8. Apparatus as claimed in claim 6, wherein the applicator plate has a bottom face in surface to surface contract with a base pedestal supporting the crimping apparatus, said plate and said pedestal being fixedly secured together, said crystal being secured in the opening, which opens into said bottom face, by means of a mounting screw having a screw head which is flush with said bottom face.

9. Apparatus as claimed in claim 8, wherein the piezoelectric crystal is supported on a clamping ring surrounding the screw head and having a bottom surface which is flush with the bottom surface of the applicator plate.

10. Apparatus for crimping electrical terminals to wires, the apparatus comprising; a crimping die; a crimping anvil; means actuable to set the crimp height of the crimping die; an electric motor for driving the die through cycles of operation each comprising a working stroke towards the anvil to crimp the terminal thereon to a wire and a return stroke away from the anvil; a logic circuit for controlling the motor and being actuable to stop the motor upon receipt of a stop signal; a load cell for measuring the value of the crimping force applied to the terminal during each of said cycles of operation, an encoder for continuously measuring the position of the die during each cycle of operation; a circuit for sampling and holding the results of said measurements to produce an actual crimping force value envelope and for holding an ideal crimping force value envelope fed into said sampling and holding circuit; a comparator having a first part for comparing the incremental values of said actual value envelope with corresponding incremental values of said ideal envelope, said first part having outlet means, and a second part for comparing the area defined by said actual envelope with the area defined by said ideal envelope, said second part having outlet means; a microprocessor having a first and a second gate therein, said first outlet means being connected to said first gate and said second outlet means being connected to said second gate, each gate having an evaluation window defining an upper signal threshold and a lower signal threshold, each gate being connected to said logic circuit, for emitting said stop signal should a predetermined proportion of signals received by said gate from said comparator lie beyond either signal threshold of the gate, the microprocessor being programmable to actuate said crimp height setting means to reset the crimp height of the die in response to a crimp height resetting instruction signal and having an inlet-outlet port for transmitting said stop signal from the microprocessor to a host computer and for receiving a crimp height resetting instruction signal from the host computer to cause the microprocessor to reset the crimp height of the die in accordance with an evaluation of the stop signal by the host computer.

11. In a lead-making machine, a plurality of apparatus each for crimping electrical terminals to wires, each apparatus comprising; a crimping die; a crimping anvil; an electrical motor for driving the die through cycles of operation each consisting of a working stroke towards the anvil to crimp a terminal on the anvil to a wire and a return stroke away from the anvil; a logic circuit for controlling the operation of the motor; a load cell for measuring the value of the crimping force applied to the terminal during each cycle of operation; means for continuously measuring the position of the die during each cycle of operation; means for sampling and holding the results of said measurements to produce an actual crimping force value envelop; a comparator for comparing said actual envelope with said ideal envelope; a microprocessor for activating said logic circuit to stop, start, and control the speed of, said motor, and for producing a failure or a success signal indicative of the result of said comparison and thus of the quality of the crimped connection between the terminal and the wire;

the lead-making machine further comprising a host computer connected to the microprocessor of each of said crimping apparatus to receive the signals produced thereby and upon receipt of a failure signal from a respective microprocessor to cause it to actuate its associated logic circuit to initiate a test crimping program; and to average and store the actual crimping force envelopes produced by the test program, and said respective microprocessor to signal the result of the test program to the host computer for evaluation by the host computer to determine whether the host computer should signal said respective microprocessor to case its associated crimping apparatus to cease crimping operations.

12. In crimping operations, a method of monitoring the quality of crimped connections each produced by the application of a compressive crimping force to a crimping barrel of an electrical terminal with a wire therein, the method comprising the steps of:

measuring the peak value of the crimping force and comparing the peak value with a reference value;

measuring the incremental values of the crimping force during its application;

storing the incremental values in the form of an actual crimping force value envelope;

measuring the incremental values of an ideal reference crimping force during its application;

storing the latter values in the form of an ideal crimping force value envelope;

comparing said envelopes to determine the quality of each respective crimped connection;

producing a crimp quality success signal or a crimp quality failure signal in dependence upon the result of each comparison;

transmitting the failure signal to a host computer for evaluation thereby;

receiving from the host computer in response to said failure signal, an instruction dependent upon said evaluation, to initiate a test crimping program and to average and store the actual crimping force value envelopes produced by the test crimping program to produce an average crimping force value envelope; and carrying said instruction and transmitting the resulting average crimping force value envelope to the host computer for evaluation, thereby to determine whether the host computer should issue a further instruction for the crimping operations to be terminated.

* * * * *